US010224776B2

United States Patent
Buskirk et al.

(10) Patent No.: US 10,224,776 B2
(45) Date of Patent: Mar. 5, 2019

(54) RETENTION ASSEMBLY FOR STATOR BAR USING SHIM WITH STATOR WEDGE AND RELATED METHOD

(71) Applicant: General Electric Company, Schnectady, NY (US)

(72) Inventors: Eric Steven Buskirk, Scotia, NY (US); Andrew Duane Brown, Saratoga Springs, NY (US); James Jonathan Grant, Niskayuna, NY (US); Curtis Maurice Hebert, Guilderland, NY (US); Benjamin Alber Mancuso, Schenectady, NY (US); Matthew Robert Martin, Schenectady, NY (US); Jessica Mary Powers, Colonie, NY (US)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 14/729,205

(22) Filed: Jun. 3, 2015

(65) Prior Publication Data
US 2016/0359385 A1 Dec. 8, 2016

(51) Int. Cl.
*H02K 3/487* (2006.01)
*H02K 15/00* (2006.01)

(52) U.S. Cl.
CPC ......... *H02K 3/487* (2013.01); *H02K 15/0018* (2013.01)

(58) Field of Classification Search
CPC .......................... H02K 3/487; H02K 15/0018
(Continued)

(56) References Cited

U.S. PATENT DOCUMENTS 2,990,487 A * 6/1961 Stigler .................. H02K 3/487
29/451
4,200,818 A * 4/1980 Ruffing .................. H02K 3/487
310/214

(Continued)

FOREIGN PATENT DOCUMENTS

DE 2123520 A1 11/1972

OTHER PUBLICATIONS

European Search Report and Opinion issued in connection with corresponding European Application No. 6172121.2 dated Nov. 7, 2016.

*Primary Examiner* — John K Kim
(74) *Attorney, Agent, or Firm* — Ernest G. Cusick; Hoffman Warnick LLC (57) ABSTRACT

A retention assembly for retaining a plurality of elements in a stator slot of an electric machine is provided. The retention assembly may include a stator wedge fixedly positioned in a dovetail in the stator slot to retain the plurality of elements; a top ripple spring between the plurality of elements and the stator wedge; and at least one shim positioned between the stator wedge and a load bearing surface of the dovetail. A method may include compressing the stator wedge in the stator slot from a first position thereof relative to the dovetail of the stator slot, the compressing creating a gap between the stator wedge and the dovetail. A shim may be inserted in the gap; the compressing released such that the shim retains the stator wedge in a second position that is more compressed relative to the plurality of elements in the stator slot compared to the first position.

14 Claims, 5 Drawing Sheets

(58) Field of Classification Search
USPC .................................................. 310/214, 215
IPC ............................................. H02K 3/487,15/00
See application file for complete search history.

(56) References Cited

U.S. PATENT DOCUMENTS

| | | | | |
|---|---|---|---|---|
| 4,278,905 A * | 7/1981 | Chari | ...................... | H02K 3/46 |
| | | | | 310/214 |
| 4,607,183 A * | 8/1986 | Rieber | ................... | H02K 3/487 |
| | | | | 174/DIG. 20 |
| 4,710,663 A * | 12/1987 | Reid | ...................... | H02K 3/487 |
| | | | | 310/214 |
| 6,218,756 B1 * | 4/2001 | Gardner | ................... | H02K 3/48 |
| | | | | 310/214 |
| 6,294,855 B1 | 9/2001 | Kelleher | | |
| 6,327,762 B2 | 12/2001 | Kelleher | | |
| 6,331,745 B2 | 12/2001 | Blakelock et al. | | |
| 6,597,081 B2 * | 7/2003 | Dawson | ................. | H02K 1/185 |
| | | | | 310/254.1 |
| 6,775,900 B2 * | 8/2004 | Dawson | ................. | H02K 1/185 |
| | | | | 29/596 |
| 7,154,205 B2 | 12/2006 | Yung et al. | | |
| 7,866,421 B2 | 1/2011 | Moore et al. | | |
| 8,370,086 B2 | 2/2013 | Reed | | |
| 8,829,769 B1 * | 9/2014 | Rao | .......................... | H02K 1/04 |
| | | | | 310/216.049 |
| 8,839,684 B2 | 9/2014 | Banowetz et al. | | |
| 2001/0004175 A1 | 6/2001 | Kelleher | | |
| 2001/0013736 A1 | 8/2001 | Blakelock et al. | | |
| 2002/0070630 A1 * | 6/2002 | Dawson | ................. | H02K 1/185 |
| | | | | 310/254.1 |
| 2002/0070631 A1 * | 6/2002 | Dawson | ................. | H02K 1/185 |
| | | | | 29/596 |
| 2006/0208598 A1 | 9/2006 | Yung et al. | | |
| 2009/0102326 A1 * | 4/2009 | Chiba | ................ | H03H 9/02023 |
| | | | | 310/367 |
| 2010/0109469 A1 * | 5/2010 | Rozier | ................... | H02K 3/487 |
| | | | | 310/214 |
| 2011/0301874 A1 | 12/2011 | Reed | | |
| 2013/0162985 A1 * | 6/2013 | Berkcan | ............... | G01M 11/086 |
| | | | | 356/234 |
| 2016/0359385 A1 * | 12/2016 | Buskirk | ............. | H02K 15/0018 |

* cited by examiner

RETENTION ASSEMBLY FOR STATOR BAR USING SHIM WITH STATOR WEDGE AND RELATED METHOD

BACKGROUND OF THE INVENTION

The disclosure relates generally to electric machine stators, and more particularly, to a retention assembly using a shim with a stator wedge of an electric machine and a related method.

Figure 1:
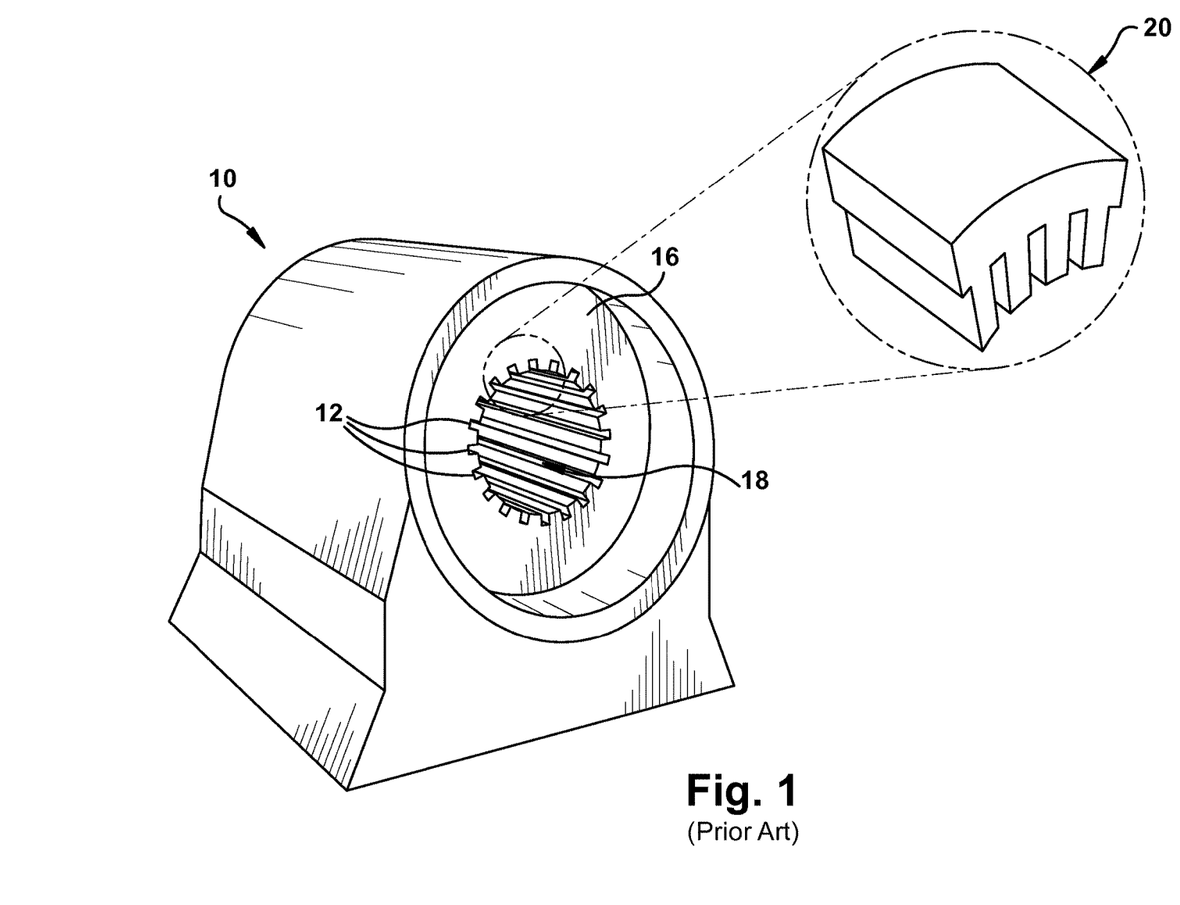
FIG. 1 is a perspective end view of a conventional electric machine.

Electric machines such as motors and generators include stator windings, also known as stator coils or bars, which are routinely inspected to verify their operation during scheduled outages. FIG. 1 is a perspective end view of a conventional electric machine 10. Electric machine 10 includes a stator core 16 having a plurality of stator slots 12 to accommodate a stator bar to generate an electro-magnetic flux. Stator slots 12 are configured to accommodate stator bars to be positioned in the stator slots defined around an inner circumference of stator core 16. The stator bars may be formed from a plurality of flat bar conductors that are coupled together to form a predetermined winding path. In one approach, the stator bars are fabricated from Roebel transposed rectangular copper strands. A rotor (not shown) may be disposed within an opening 18 in stator core 16 where an air or coolant gap is defined between the rotor and stator core 16. A partial, exploded view of the stator is illustrated by reference numeral 20 that is described in detail with reference to FIG. 2. Electric machine 10 may be any electrical rotating machine or dynamoelectric machine, including but not limited to a motor or generator.

Figure 2:
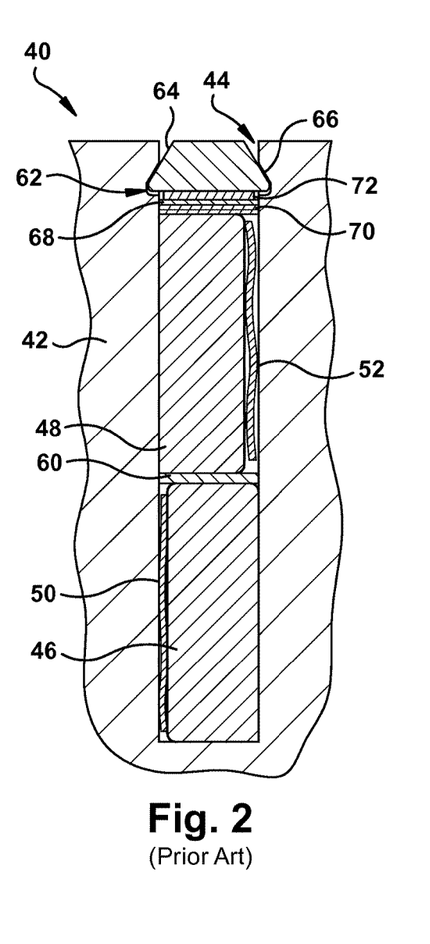
FIG. 2 is a cross-sectional view of a conventional stator slot.

FIG. 2 is a cross-sectional view of a conventional stator slot. Stator 40 may include a stator core 42 and is part of a dynamoelectric machine or electric machine, such as a motor or a generator. Stator core 42 includes a plurality of radially extending stator slots 44 for housing one or more stator bars; two stator bars 46 and 48 are shown. As will be appreciated, stator core 42 extends around a central axis and stator slots 44, as well as stator bars 46 and 48, extend longitudinally parallel to that axis and in a generally radially inward direction. In the illustrated form, side ripple springs 50 and 52 maintain stator bars 46, 48 firmly against the opposite sides of stator slot 44. Radial space in stator slots 44 may be taken up by radial fillers 60 and 70. A retention assembly 62 includes stator wedges 64 that extend longitudinally (into page) along a radially inner portion of stator slots 44 with their lateral edges residing in shaped mating grooves or dovetails 66 formed in stator slots 44. A top ripple spring 68 may be positioned at least partially within stator slot 44 such that top ripple spring 68 is adjacent to at least one slot filler 70. Top ripple spring 68 and stator bars 46, 48 may be secured in stator slot 44 using a plurality of stator wedge slides 72 (not always necessary) and stator wedges 64.

During operation, the stator bars of an electric machine are typically under multiple stresses such as electromagnetic and mechanical forces, chemical and thermal stresses. The mechanical stress imposed on a surface of stator bar(s) 46, 48 may be laterally, radially and axially applied. As shown in the detailed cross-sectional view of FIG. 3, over time, stator slot 44 contents can become loose due to various reasons such as but not limited to: material creep, material shrinkage, or wear on components such as ripple spring 68, stator wedges 64, dovetails 66, etc. When the contents becomes loose, it allows relative motion (arrow A) between the stator bar(s), slot contents such as top ripple spring 68, and stator core 42, which can cause stator bar vibration and abrasion. Excessive bar abrasion can be damaging to an electric machine and can necessitate an expensive stator bar rewind. To avoid damage to the electric machine, a typical maintenance item is to check stator wedge 64 tightness. If enough stator wedges 64 are determined to be loose, the unit is typically re-wedged. That is, the affected stator wedges are removed and new wedges inserted. The re-wedging process is time consuming and expensive because it requires hundreds of wedges to be cut out or driven out of position. For example, the re-wedging process can cost $100,000-300,000 and require 2-5 days of machine outage time. The re-wedging process can also cause damage to other components of the generator, adding costs. Several attempts have been made to avoid re-wedging over the years such as tightenable wedges incorporating integral radial jacking screws or the ability to further drive tapered wedge slides without disassembly. Most previous methods, however, required the replacement of the existing stator wedge. In addition, while re-wedging corrects the problem, the looseness may return after the new wedges are exposed to the same vibration and abrasion; thus, requiring another re-wedging process to be completed later.

BRIEF DESCRIPTION OF THE INVENTION

A first aspect of the disclosure provides a retention assembly for retaining a plurality of elements in a stator slot of an electric machine, the retention assembly comprising: a stator wedge fixedly positioned in a dovetail in the stator slot to retain the plurality of elements against pressure of a ripple spring positioned between the plurality of elements and the stator wedge; and at least one shim positioned between the stator wedge and a load bearing surface of the dovetail.

A second aspect of the disclosure provides an electric machine comprising: a stator core including a stator slot; a plurality of elements in the stator slot, the plurality of elements including a stator bar; a stator wedge fixedly positioned in a dovetail in the stator slot to retain the plurality of elements in the stator slot against pressure of a ripple spring positioned between the plurality of elements and the stator wedge; and at least one shim positioned between the stator wedge and a load bearing surface of the dovetail.

A third aspect of the disclosure provides a method of tightening a retention assembly for retaining a plurality of elements in a stator slot of a stator core of an electric machine, the retention assembly including a stator wedge positioned in a dovetail of the stator slot, the method comprising: compressing the stator wedge in the stator slot from a first position thereof relative to the dovetail of the stator slot, the compressing creating a gap between the stator wedge and the dovetail; inserting a shim in the gap; and releasing the compressing of the stator wedge such that the shim retains the stator wedge in a second position that is more compressed relative to the plurality of elements in the stator slot compared to the first position.

A fourth aspect of the invention provides a shim for a retention assembly for retaining a plurality of elements in a stator slot of an electric machine, the retention assembly including a stator wedge fixedly positioned in a dovetail in the stator slot to retain the plurality of elements, the shim comprising: a layer of material positioned between the stator wedge and a load bearing surface of the dovetail.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a retention assembly for retaining a plurality of elements in a stator slot of an electric machine. The disclosure also provides an electric machine including the retention assembly and a related method of installing the shim.

Figure 4:
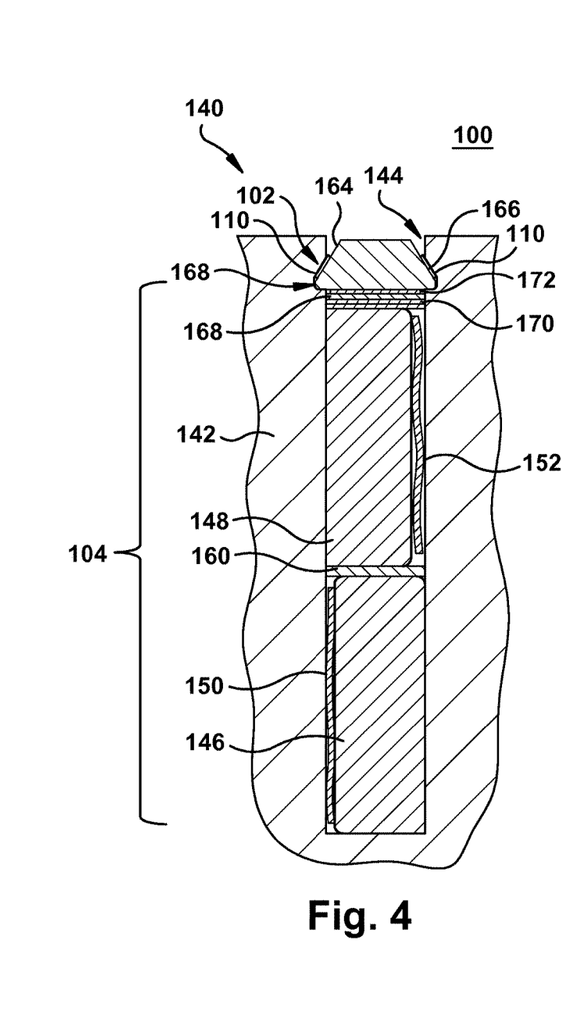
FIG. 4 is a cross-sectional view of an electric machine and retention assembly according to embodiments of the invention.
Figure 5:
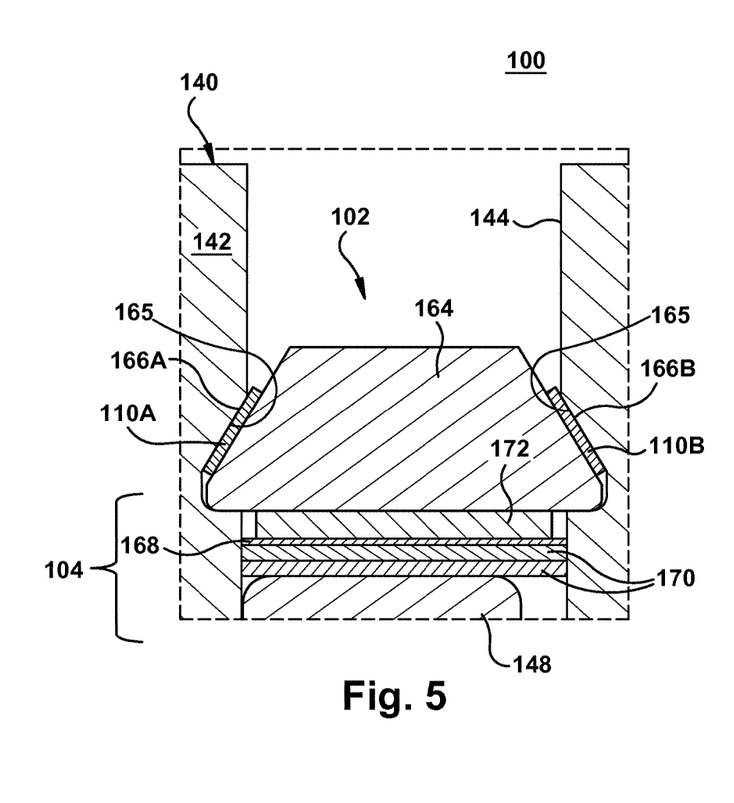
FIG. 5 is a detailed cross-sectional view of an electric machine and retention assembly according to embodiments of the invention.

FIG. 4 is a cross-sectional view and FIG. 5 is a detailed cross-sectional view of a portion of an electric machine 100 and a retention assembly 102 according to embodiments of the invention. Electric machine 100 may include any now known or later developed dynamoelectric machine, such as a motor or a generator. As shown in FIG. 4, electric machine 100 may include a stator 140 including a stator core 142 having a stator slot 144. As understood, stator core 142 actually includes a plurality of radially extending stator slots 144 (not shown here, see FIG. 1) each arranged to accommodate a plurality of elements 104 therein. Stator slots 144 are defined around an inner circumference of stator core 142 (see FIG. 1). As will be appreciated, stator core 142 extends around a central axis and stator slots 144 extend longitudinally parallel to that axis and in a generally radially inward direction.

As shown in FIGS. 4 and 5, a plurality of elements 104 are positioned in each stator slot 144. In accordance with embodiments of the invention, retention assembly 102 includes stator wedge(s) 164 fixedly positioned in dovetail (s) 166 in stator slot 144 to retain plurality of elements 104 in the slot against the pressure of a (top) ripple spring 168 positioned between the plurality of elements 104 and stator wedge(s) 164. Plurality of elements 104, as will be described herein, may include a stator bar 146, 148, a slot filler 160, 170, side ripple springs 150, 152, and wedge slide 172.

Stator bars 146, 148 may include any now known or later developed stator windings to generate an electro-magnetic flux. In the illustrative embodiment shown, two stator bars 146, 148 are illustrated. It is understood, however, that one or more than two stator bars may be employed. Any number of slot fillers 160, 170 may be employed to fill radial space in stator slots 144 and ensure proper alignment and tightness of elements 104. With regard to the ripple springs, top ripple spring 168 may be positioned at least partially within stator slot 144 such that top ripple spring 168 is adjacent to at least one slot filler 170. As understood, a plurality of top ripple springs 168 may be employed end-to-end in each stator slot 144. Where desired, elements 104 may also include side ripple springs 150, 152 to maintain stator bars 146, 148 firmly against the opposite sides of stator slot 144. Plurality of elements 104 can be secured in stator slot 144 using a plurality of stator wedges 164. If desired, a plurality of stator wedge slides 172 may also be employed. Each stator wedge 164 extends longitudinally (into page) along a radially inner portion of each stator slot 144 with their lateral edges residing in shaped, dovetails 166 formed in stator slot 144. As understood, a plurality of stator wedges 164 may be employed end-to-end in each stator slot 144. Each stator wedge 164 may include any now known or later developed material capable of withstanding the environment of electric machine 100 such as but not limited to: a cotton phenolic composite, an epoxy-glass laminate, or any other now known or later developed wedge material.

In contrast to conventional retention assemblies, retention assembly 102 also includes at least one shim 110 positioned between stator wedge 164 and a load bearing surface 165 of dovetail 166. As will be described, shim(s) 110 act to tighten the retention assembly for retaining plurality of elements 104 in stator slot 144. Each shim 110 has a length (into page) that is substantially equal to a respective stator wedge 164 that is adjacent thereto, i.e., the shim has the same length minus any necessary clearance at each end of the shim. Although shims 110 may be used selectively within electric machine 100, a shim 110 may be positioned along a length of each stator wedge 164. Thus, a plurality of shims 110 may be employed along a length of a plurality of stator wedges 164. As illustrated in FIG. 5, dovetail 166 includes a first groove 166A and an opposing second groove 166B, and stator wedge 164 is fixedly positioned in first and opposing second grooves 166A, 166B. In this case, a first shim 110A may be positioned between stator wedge 164 and load bearing surface 165 of first groove 166A and a second shim 110B between stator wedge 164 and load bearing surface 165 of opposing second groove 166B. Here, as described herein, first shim 110A may include a plurality of first shims 166A positioned along a length of stator wedges 164 (into page), and opposing, second shim 110B may include a plurality of opposing, second shims 110B positioned along a length of the stator wedges 164.

Each shim 110 may be made a non-conductive material such as but not limited to: a phenolic material, a para-aramid synthetic material such as that commercially available from Dupont under the trade name Kevlar, a meta-aramid material such as that commercially available from Dupont under the trade name Nomax, and a rigid fiberglass material. In an alternative embodiment, shims 110 could take the form of hardened material from a curable liquid. Regardless of the material used for the shims, each shim 110 may also include a low coefficient of friction layer that may aid installation and/or reduce wear on components, e.g., stator wedge 164, shims 110 and/or dovetails 166. The low coefficient of friction layer may include, for example, a layer of polytetraflouorethylene (PTFE) thereon, such as that commercially available from Dupont under the Teflon trade name. Shims 110 may have any thickness desired to fill as much or as little of gaps 184A, 184B, as desired, to provide the desired additional pressure in slot 144 to elements 104. The thickness may vary drastically machine to machine, but in one example, shims 110 may be 0.008-0.022 inches (0.20-0.56 mm) thick. While one shim 110 is shown being inserted into each gap, each shim 110 may include multiple layers of material or multiple stacked shims.

Figure 7:
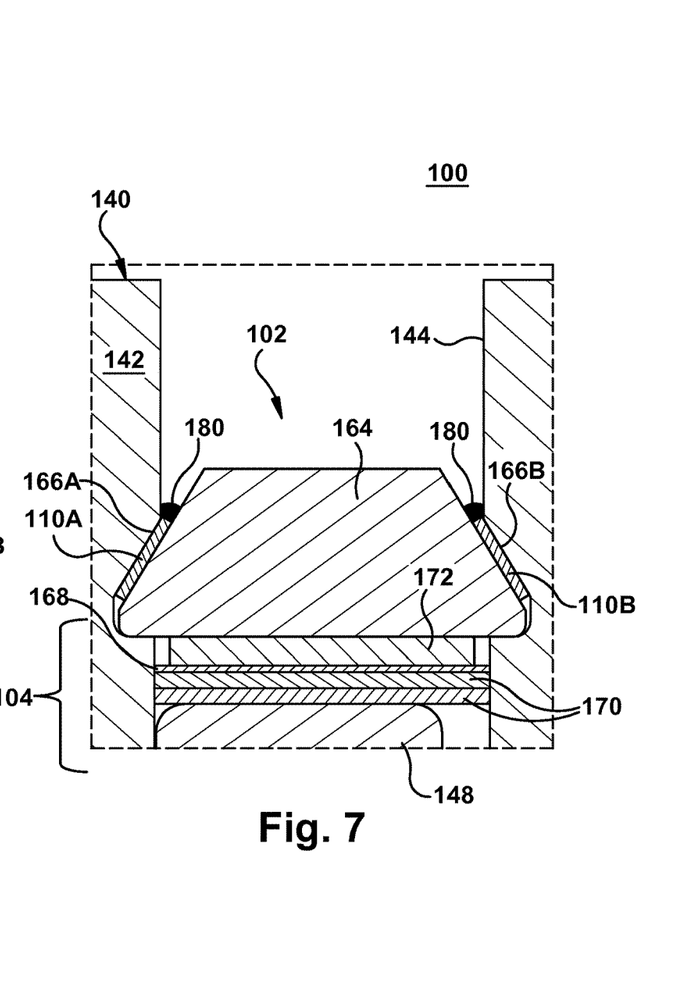

Referring to FIG. 7, in an optional embodiment, retention assembly 102 may also include an adhesive 180 adhering an edge of shim 110 to at least one of stator wedge 164 and stator slot 144. Adhesive 180 may include any now known or later developed adhesive capable of withstanding the environment of electric machine 100 including but not limited to: an epoxy, room temperature vulcanizing (RTV) caulk such as a silicon caulk, etc. Adhesive 180, although not necessary in all instances, acts to provide additional retention of shims 110 in between stator wedges 164 and dovetails 166.

Figure 6:
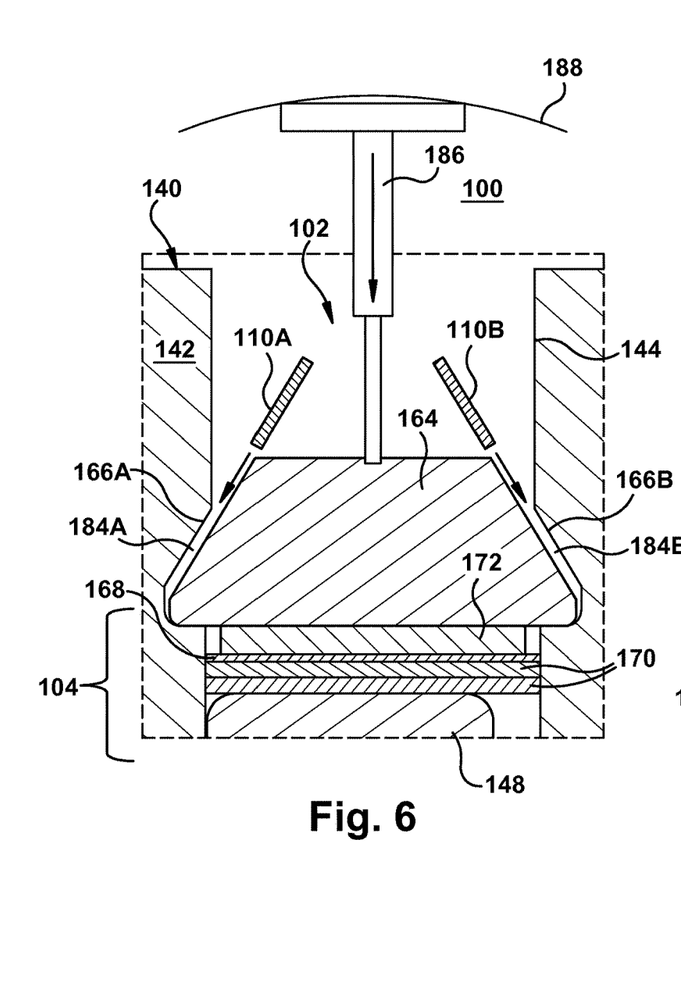
FIGS. 6-7 are detailed cross-sectional views of a method of tightening a retention assembly for retaining a plurality of elements in a stator slot according to embodiments of the invention.

Referring to FIGS. 6 and 7, embodiments of a method of tightening a retention assembly for retaining plurality of elements 104 in stator slot 144 of stator core 142 of electric machine 100 will now be described. As shown in FIG. 6, the process may begin by compressing stator wedge 164 in stator slot 144 from a first position thereof relative to dovetail 166 of stator slot 144. The first position may be substantially identical to that shown in FIG. 3 in which stator wedge 64 is loose compared to its originally installed state due to vibrations and abrasions experienced during operation of electric machine 10. The compression of stator wedge 164 also compresses plurality of elements 104 in stator slot 144, most notably, but not necessarily limited to, top ripple spring 168. As shown in FIG. 6, the compressing creates a gap 184A and/or 184B between stator wedge 164 and dovetail(s) 166A and/or 166B. The compressing can be carried out in any now known or later developed fashion. In one embodiment, the compressing includes using a ram 186 configured to interact with an opposing side 188 (shown schematically in FIG. 6) of stator core 142 from stator wedge 164, i.e., when the rotor is removed. Ram 186 may include any now known or later developed ram capable of providing sufficient force to compress stator wedge 164, e.g., a pneumatic or hydraulic ram. The force required may vary drastically from machine to machine. In one example, the force may be approximately 250-350 pounds per inch (~1.72 MPa-2.41 MPa).

Next, as observed by comparing FIGS. 5 and 6, a shim 110 is inserted in a gap 184A and/or 184B. In an alternative embodiment, shown in FIG. 8 after compression release, only a single shim 110B may be inserted into a single gap 184B for one or more stator wedges 164. Although shown on the right side in FIG. 8, the single shim may also be inserted on the opposing side.

Figure 3:
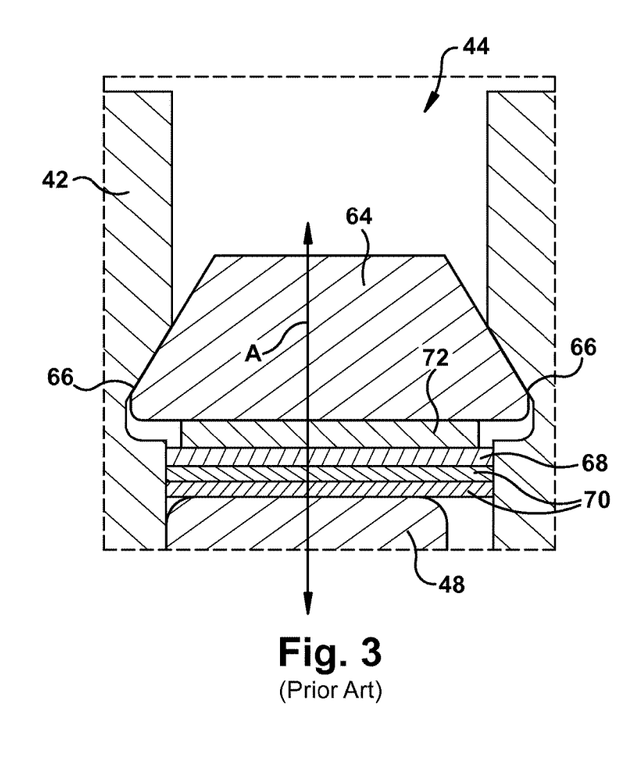
FIG. 3 is a detailed cross-sectional view of a conventional stator slot exhibiting stator wedge looseness.
Figure 8:
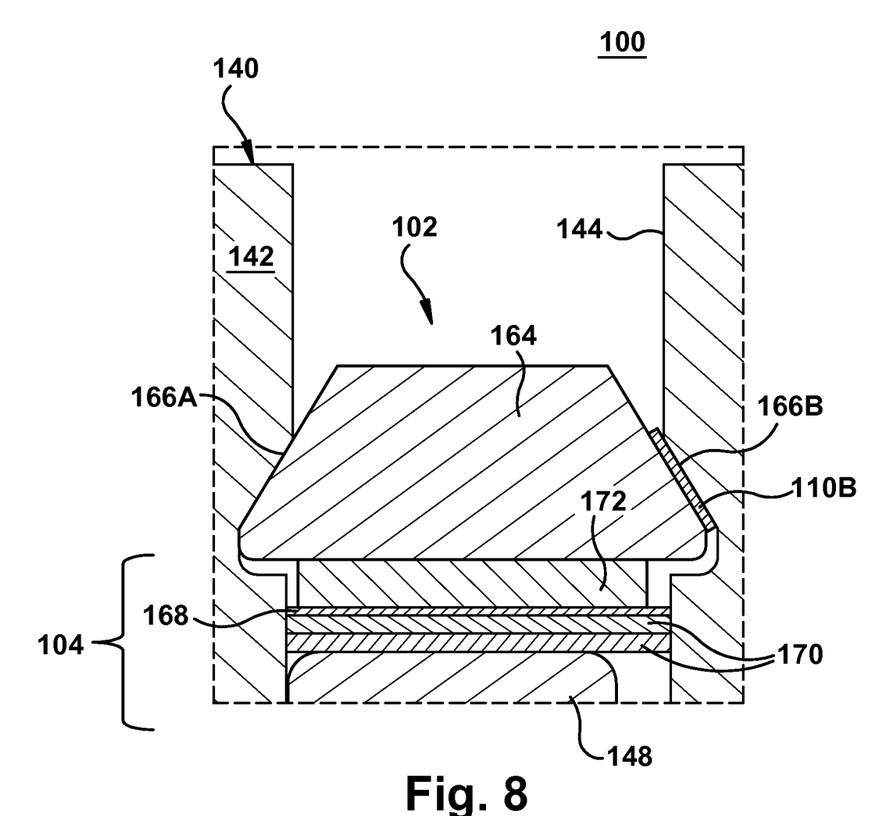
FIG. 8 is a detailed cross-sectional view of an electric machine and retention assembly according to alternative embodiments of the invention.

As shown in FIGS. 5, 7 and 8, releasing the compressing of stator wedge 164 allows shim(s) 110A and/or 110B to retain stator wedge 164 in a second position that is more compressed relative to plurality of elements 104 in stator slot 144 compared to the first position, shown in FIG. 3. More specifically, the second position (FIGS. 5 and 7) of stator wedge 164 relative to stator core 144 is more radially outward (down on page) compared to the first position (FIG. 3). When stator wedge 164 is released, shims 110A and/or 110B locate stator wedges 164 radially outward and compresses elements 104 and top ripple spring 168, thus increasing slot pressure. FIG. 7 shows an optional step of adhering an edge of shim(s) 110A, 110B to at least one of stator wedge 164 and stator slot 144, e.g., using the above-described adhesive 180. The adhesive may be applied using any solution such as a caulk gun.

The above-described methodology can be carried out manually or with an in-situ robot/tooling. In the latter case, the methodology may be carried out with the rotor in-place. For example, the process may be automatically carried out using a robotic or automated system capable of compressing the stator wedge and inserting one or more shims with the rotor in-place. In addition, the above-described methodology may be repeated for selected stator wedges 164 in a particular slot 144, or for stator wedges 164 in other stator slots 144 of stator core 142. The necessary looseness required to indicate a particular stator wedge 164 should be shimmed may be user defined, and may be tested using any solution, e.g., an Echotip, Picollo I or II hardness test. A map or record of stator wedges may be prepared indicating stator wedge tightness, e.g., tight, hollow, loose, etc., according to standardized rules. The map/record may be used to direct shimming. In one illustrative proof-of-concept test, the average stiffness was increased 173 Leebs; however, other values may be observed in other settings.

Retention assembly 102 and electric machine 100 described herein address the problem of loose stator slot elements without having to provide a re-wedging, thus avoiding the costs of the re-wedging process. In addition, retention assembly 102 also can eliminate the outage duration and cost associated with a full or partial re-wedge. Since each stator wedge within a row (i.e., stator slot) can be shimmed individually, retention assembly 102 can be applied where necessary instead of removing an entire row of stator wedges. Additionally, since the original stator wedges are not removed, there is less risk to damage a machine during the process described. Also, since each stator wedge 164 is not removed, subsequent operation of the machine may not cause the loss of tightness that could occur with new stator wedges. Consequently, additional re-wedging can be avoided.

The foregoing drawings show some of the processing associated according to several embodiments of this disclosure. In this regard, each drawing represents a process associated with embodiments of the method described. It should also be noted that in some alternative implementations, the acts noted in the drawings may occur out of the order noted in the figure or, for example, may in fact be executed substantially concurrently or in the reverse order, depending upon the act involved. Also, one of ordinary skill in the art will recognize that additional steps that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A retention assembly for retaining a plurality of elements in a stator slot of an electric machine, the retention assembly comprising:
    a stator wedge fixedly positioned in a dovetail in the stator slot to retain the plurality of elements against pressure of a ripple spring positioned between the plurality of elements and the stator wedge; and
    at least one rectangular cross section shim inserted in a gap between the stator wedge and a load bearing surface of the dovetail, wherein a smooth linear surface of the shim meets the load bearing surface, further comprising an adhesive adhering an edge of the rectangular cross section shim to at least one of the stator wedge and the stator slot.

2. The retention assembly of claim 1, wherein the plurality of elements includes a stator bar and a slot filler.

3. The retention assembly of claim 1, wherein the dovetail includes a first groove and an opposing second groove, and the stator wedge is fixedly positioned in the first groove and the opposing second groove, and
    wherein the shim includes a first rectangular cross section shim between the stator wedge and a loading bearing surface of the first groove and a second rectangular cross section shim between the stator wedge and a load bearing surface of the opposing second groove.

4. The retention assembly of claim 1, wherein the stator wedge includes one of a cotton phenolic composite and an epoxy-glass laminate.

5. The retention assembly of claim 1, wherein the rectangular cross section shim is made of a non-conductive material selected from the group consisting of: a phenolic material, a para-aramid synthetic material, a meta-aramid material and a rigid fiberglass material.

6. The retention assembly of claim 1, wherein the rectangular cross section shim includes a layer of polytetraflouorethylene (PTFE) thereon.

7. An electric machine comprising:
    a stator core including a stator slot;
    a plurality of elements in the stator slot, the plurality of elements including a stator bar;
    a stator wedge fixedly positioned in a dovetail in the stator slot to retain the plurality of elements in the stator slot against pressure of a ripple spring positioned between the plurality of elements and the stator wedge; and
    at least one rectangular cross section shim inserted in a gap between the stator wedge and a load bearing surface of the dovetail, wherein a smooth linear surface of the shim meets the load bearing surface, further comprising an adhesive adhering an edge of the rectangular cross section shim to at least one of the stator wedge and the stator slot.

8. The electric machine of claim 7, wherein the dovetail includes a first groove and an opposing second groove, and the stator wedge is fixedly positioned in the first groove and the opposing second groove, and
    wherein the rectangular cross section shim includes a first rectangular cross section shim between the stator wedge and a load bearing surface of the first groove and a second rectangular cross section shim between the stator wedge and a load bearing surface of the opposing second groove.

9. The electric machine of claim 8, wherein the stator wedge includes a plurality of stator wedges, and the first rectangular cross section shim includes a plurality of first rectangular cross section shims positioned along a length of the plurality of stator wedges, and the opposing, second rectangular cross section shim includes a plurality of opposing, second rectangular cross section shims positioned along a length of the plurality of stator wedges.

10. The electric machine of claim 7, wherein the rectangular cross section shim is made of a non-conductive material selected from the group consisting of: a phenolic material, a para-aramid synthetic material, a meta-aramid material and a rigid fiberglass material.

11. The electric machine of claim 7, wherein the rectangular cross section shim includes a layer of polytetraflouorethylene (PTFE) thereon.

12. A rectangular cross section shim for a retention assembly for retaining a plurality of elements in a stator slot of an electric machine, the retention assembly including a stator wedge fixedly positioned in a dovetail in the stator slot to retain the plurality of elements, the rectangular cross section shim comprising:
    a rectangular cross section layer of material inserted in a gap between the stator wedge and a load bearing surface of the dovetail, wherein a smooth linear surface of the layer meets the load bearing surface, further comprising an adhesive adhering an edge of the rectangular cross section layer of material to at least one of the stator wedge and the stator slot.

13. The rectangular cross section shim of claim 12, wherein the rectangular cross section layer of material includes a non-conductive material selected from the group consisting of: a phenolic material, a para-aramid synthetic material, a meta-aramid material and a rigid fiberglass material.

14. The rectangular cross section shim of claim 12, wherein the rectangular cross section layer of material includes a layer of polytetraflouorethylene (PTFE) thereon.

* * * * *